United States Patent
Ferreira Da Silva

(10) Patent No.: US 11,982,156 B2
(45) Date of Patent: May 14, 2024

(54) LASER MANDREL FOR REMOVAL OF SCALE IN PRODUCTION EQUIPMENT

(71) Applicant: Petróleo Brasileiro S.A.-Petrobras, Rio de Janeiro (BR)

(72) Inventor: Mario Germino Ferreira Da Silva, Rio de Janeiro (BR)

(73) Assignee: Petróleo Brasileiro S.A.-Petrobras, Rio de Janeiro (BR)

( * ) Notice: Subject to any disclaimer, the term of this patent is extended or adjusted under 35 U.S.C. 154(b) by 0 days.

(21) Appl. No.: 17/890,345

(22) Filed: Aug. 18, 2022

(65) Prior Publication Data
US 2023/0059801 A1 Feb. 23, 2023

(30) Foreign Application Priority Data
Aug. 18, 2021 (BR) ...................... 10 2021 016392 5

(51) Int. Cl.
*E21B 37/00* (2006.01)
*B08B 9/00* (2006.01)
*B23K 26/36* (2014.01)

(52) U.S. Cl.
CPC .............. *E21B 37/00* (2013.01); *B23K 26/36* (2013.01); *B08B 9/00* (2013.01)

(58) Field of Classification Search
CPC ............ E21B 37/00; B23K 26/36; B08B 9/00
See application file for complete search history.

(56) References Cited

U.S. PATENT DOCUMENTS

| | | | | |
|---|---|---|---|---|
| 10,239,157 B2* | 3/2019 | McCarren | ............. | B29C 64/205 |
| 2004/0206505 A1* | 10/2004 | Batarseh | ................. | E21B 43/24 |
| | | | | 166/302 |
| 2004/0256103 A1* | 12/2004 | Batarseh | ............. | B23K 26/128 |
| | | | | 166/55.1 |
| 2006/0102343 A1* | 5/2006 | Skinner | ..................... | E21B 7/15 |
| | | | | 166/57 |
| 2009/0205675 A1* | 8/2009 | Sarkar | ...................... | B08B 9/04 |
| | | | | 134/1 |

(Continued)

FOREIGN PATENT DOCUMENTS

| | | |
|---|---|---|
| JP | 6491173 B2 | 3/2019 |
| WO | 8301400 A1 | 4/1983 |
| WO | 2013141810 A1 | 9/2013 |

*Primary Examiner* — Robert E Fuller
*Assistant Examiner* — Neel Girish Patel
(74) *Attorney, Agent, or Firm* — Mintz, Levin, Cohn, Ferris, Glovsky and Popeo, P.C.

(57) ABSTRACT

The present invention presents a laser mandrel (9) capable of being installed in the production string, in a position below the ICVs valves (2 and 4), to be used in a first moment aiming at preventing the formation of scale in the ICVs valves (2 and 4), and, in a second moment, for the removal of scale from the production string (1).

The laser mandrel (9) of this invention is provided with fiber optic cable (5), electrical cable (6), collimators (7), and laser diodes (8). It can be applied to prevent damage to well strings with electric intelligent completion, in case there is a failure in the chemical injection system installed in the string. It also makes possible the improvement of the technique aiming at the inhibition of inorganic depositions. Furthermore, it has a significantly lower cost than the conventional squeeze and/or removal, because once it is installed in the string, it allows the management of scale.

4 Claims, 8 Drawing Sheets

(56) References Cited

U.S. PATENT DOCUMENTS

| | | | | |
|---|---|---|---|---|
| 2010/0326659 | A1* | 12/2010 | Schultz | E21B 29/06 |
| | | | | 166/297 |
| 2011/0017468 | A1* | 1/2011 | Birch | E21B 43/103 |
| | | | | 166/369 |
| 2014/0305635 | A1* | 10/2014 | Linetskiy | E21B 7/14 |
| | | | | 166/248 |
| 2014/0311528 | A1* | 10/2014 | Hallundbæk | C23F 11/173 |
| | | | | 134/22.12 |
| 2017/0275960 | A1* | 9/2017 | Linetskiy | E21B 47/135 |
| 2018/0163477 | A1* | 6/2018 | Faircloth | H01S 5/042 |
| 2020/0094352 | A1* | 3/2020 | Batarseh | B23K 26/36 |

* cited by examiner

LASER MANDREL FOR REMOVAL OF SCALE IN PRODUCTION EQUIPMENT

CROSS-REFERENCE TO RELATED APPLICATION

This application claims priority to Brazilian Application No. 10 2021 016392 5 filed on Aug. 18, 2021, and entitled "LASER MANDREL FOR REMOVAL OF SCALE IN PRODUCTION EQUIPMENT," the disclosure of which is incorporated herein by reference in its entirety.

FIELD OF THE INVENTION

The present invention is based on a concept that will be used as a scale prevention and removal system in oil well production equipment.

DESCRIPTION OF THE STATE OF THE ART

The activities and processes known from the State of the Art, aiming at the management of scale in oil wells, are basically carried out in two ways: the first is chemical inhibition through chemical inhibitor squeeze in the reservoir, which is absorbed by the rock and then gradually released into the produced water. The second is the removal of scale by the use of removal solutions in the equipment of the production system such as strings, WCT, manifolds, production lines, production risers and even surface equipment of the SPU. The difficulties encountered in these processes are mainly the need to repeat such operations at determined time intervals. In the case of squeeze, due to the useful life of the treatment; in the case of removal, due to the renewal of scale in the equipment, after a determined time interval. The risks associated with these methods are related to operational issues, since they depend on the availability of critical resources, such as a rig and/or stimulation boats, and/or financial issues, in view of the costs associated with the loss of production, due to the need to stop production to carry out the operations.

A well schematic completed in two producing intervals with two intelligent completion valves ICVs (Inflow Control Valves) in the production string (PS) is represented in FIG. 1. When this type of completion is carried out, for example, in pre-salt wells, whose formations are carbonate, the formation of calcium carbonate scale can occur in the PS and in the holes of the ICVs, as shown in FIG. 2. The scale grows inside the PS and through the holes of the ICVs to the interior of the PS, until blocking the holes of the ICV (FIGS. 3 and 4). If not controlled, the total blockage of the PS by scale can occur, which implies the loss of this piece of equipment.

Document WO2013141810A1 discloses a laser cleaning device, comprising a laser source, a handheld device, and a set of acoustic and temperature sensors. The handheld device is coupled to the fiber laser source to emit coherent pulsed light in a controllable manner, while the plurality of sensors is connected to the handheld device and configured to determine a focus position for light on a steel surface of a marine structure, in order to remove the material deposited thereon.

Document JP6491173B2 discloses a technique for removing a coating film on the surface of a structure by laser irradiation, with aspiration and recovery of the removed substance, and in particular on a fixed structure such as a bridge, a building, a ship, or a large pipe. A laser system is used to remove coating film or deposits by irradiating a laser beam using a portable laser module. The laser irradiation apparatus includes a laser oscillator, a fiber, a laser module, a suction hose, and a suction source, which may include a gas supply source and a gas hose. The laser module is a portable type and is connected to the laser oscillator through the fiber, so it can be handled at a job site. The laser output from the laser oscillator is transmitted to the laser module through the transmission fiber.

Document WO1983001400A1 discloses a method for removing materials deposited on the surfaces of objects, which is carried out by directing coherent electromagnetic radiation from a laser to the material. The power density of impact radiation is effective in removing unwanted material without damaging the underlying object. The principles of the invention are applicable to numerous surface cleaning situations, including the clearance of marine surfaces. For clearing the hull of a ship, for example, laser radiation is conducted by mirrors and focused on the hull. Deposits are shocked and dislodged from the hull.

The mentioned documents are silent regarding the use of the device for the removal of scales in oil well production strings.

In view of the difficulties present in the State of the Art, for solutions for removing and preventing scales, there is a need to develop a technology capable of presenting an effective performance and that is in accordance with environmental and safety guidelines. The mentioned documents do not have the unique features of this invention, which will be presented in detail below.

OBJECTIVE OF THE INVENTION

It is an objective of the invention to provide a device capable of controlling the formation of scale in the production strings of producing wells, particularly those provided with selective completion, such as electric intelligent completion.

It is further an objective of the invention to provide for production maintenance of wells provided with electric intelligent completion.

BRIEF DESCRIPTION OF THE INVENTION

The present invention presents a laser mandrel capable of being installed in the production string, in a position below the ICVs valves, to be used, in a first moment, in order to prevent the formation of scale in the ICVs valves (2 and 4), and, in a second moment, for the removal of scale in the production string (1).

The laser mandrel (9), object of this invention and represented in FIGS. 5 and 6, is provided with fiber optic cable (5), electrical cable (6), collimators (7), and laser diodes (8).

BRIEF DESCRIPTION OF DRAWINGS

The present invention will be described in more detail below, with reference to the attached figures which, in a schematic form and not limiting the inventive scope, represent examples of its embodiment. In the drawings, there are.

DETAILED DESCRIPTION OF THE INVENTION

Figure 1:
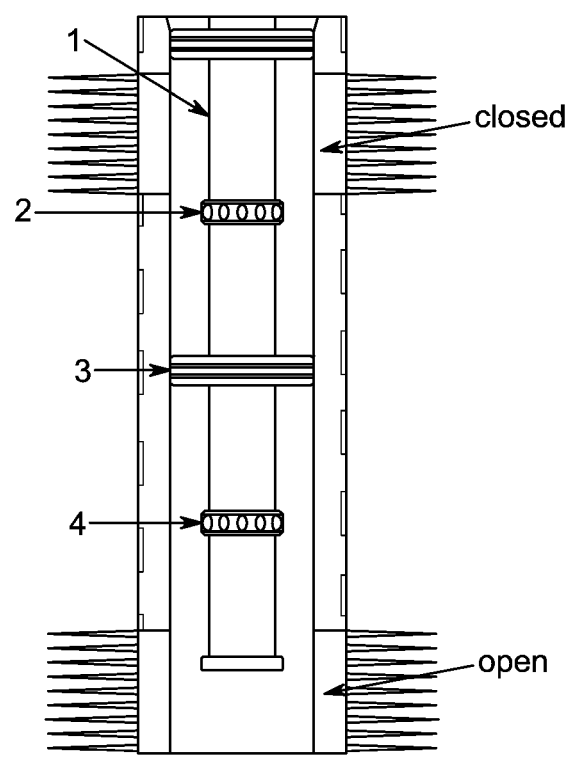
FIG. 1 illustrating a well provided with intelligent completion for two producing intervals, where they are represented: PS (1), upper ICV (2), packer (3), lower ICV (4)
Figure 2:
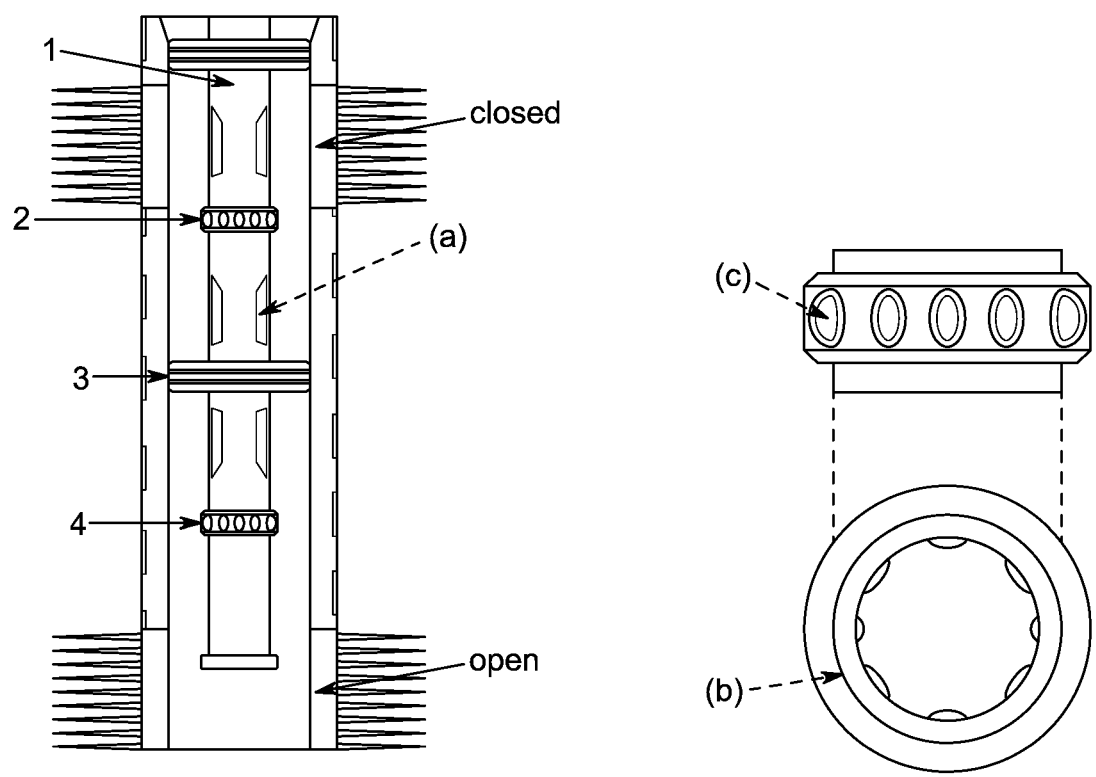
FIG. 2 illustrating the formation of scales inside the PS and through the holes of the ICVs, where there are represented: PS (1), upper ICV (2), packer (3), lower ICV (4), side view of the formation of the scale ring on the inside of the PS (a), top view of the formation of the scale ring on the inside of the PS (b), detail of the beginning of scale formation in the holes of the ICVs valves (c)
Figure 3:
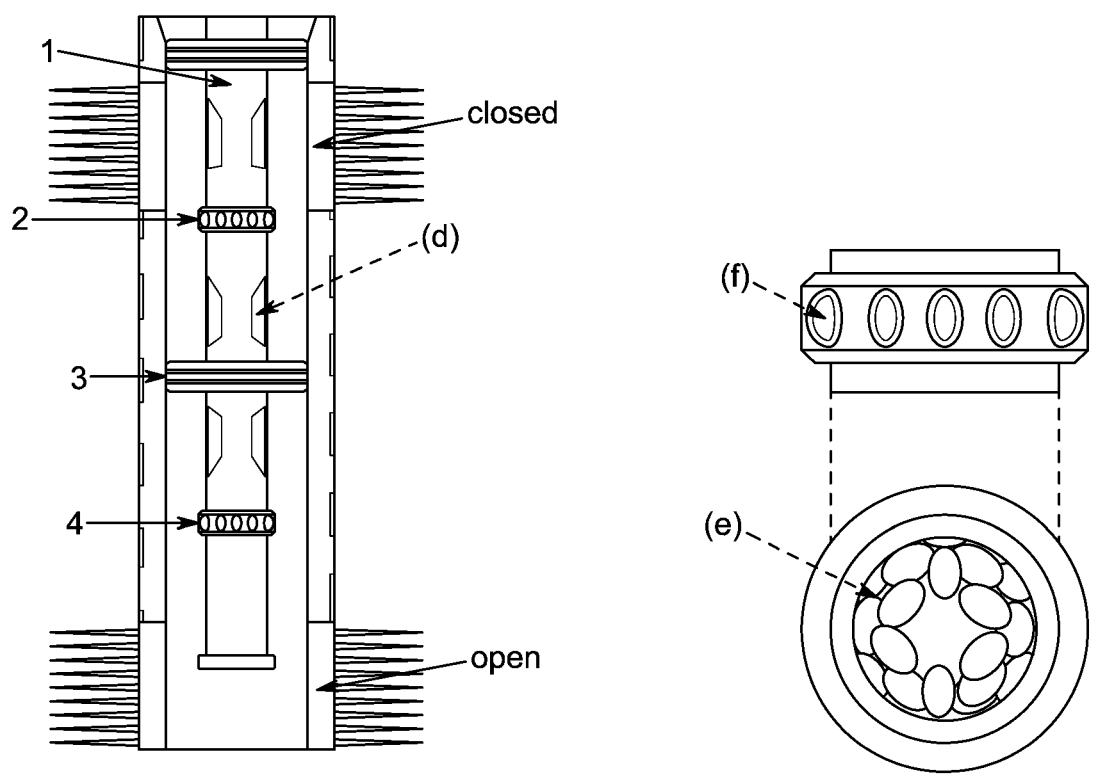
FIG. 3 illustrating the growth of scale inside the PS and through the holes of the ICVs, where the following are represented: PS (1), upper ICV (2), packer (3), lower ICV (4), side view of the increase of the thickness of the scale ring on the inside of the PS (d), top view of the increase in the thickness of the scale ring on the inside of the PS (e), detail of the growth of scale from the holes of the ICV valves to the inside of the PS (f)
Figure 4:
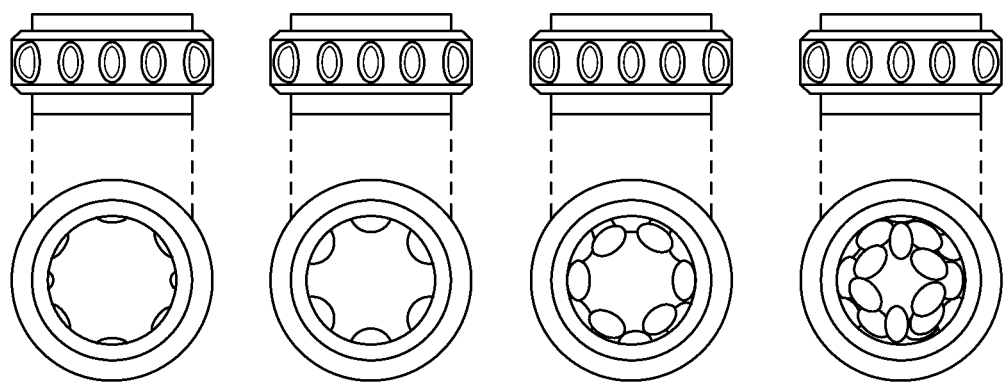
FIG. 4 illustrating the gradual blockage by scale in ICVs.
Figure 5:
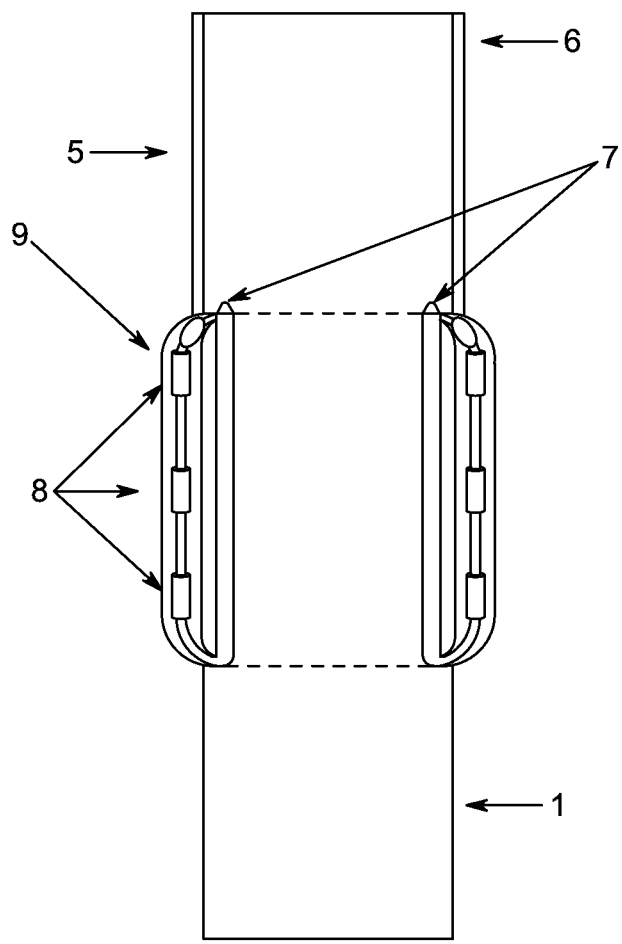
FIG. 5 illustrating the schematic of the laser mandrel tool, object of this invention, where there are represented: PS (1), fiber optic cable (5), electrical cable (6), collimators (7), laser diodes (8), laser mandrel (9)
Figure 6:
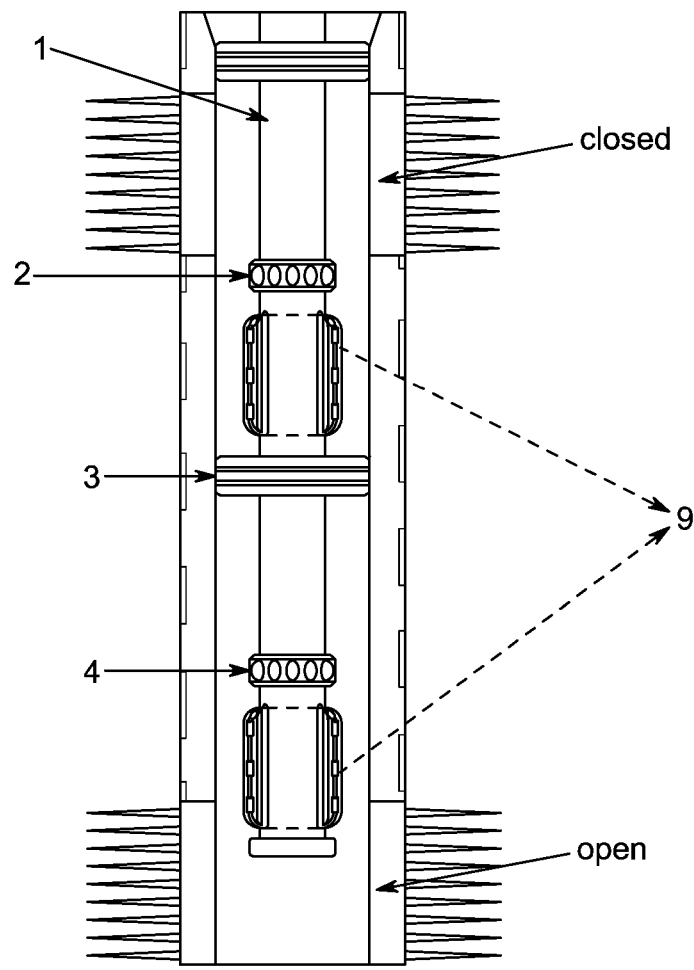
FIG. 6 illustrating the positioning of the laser mandrel in the production string, where the equipment is installed below the ICVs.

There follows below a detailed description of a preferred embodiment of the present invention, by way of example and in no way limiting. Nevertheless, there will be clear to a technician skilled in the art, from reading this description, possible further embodiments of the present invention still encompassed by the essential and optional features below.

The equipment of the invention may serve as a previous option to avoid the accumulation of scaling material, such as calcium carbonate, inside the production string of the wells, thus maintaining cleanliness, avoiding the need to apply conventional processes, such as the squeeze operation in the reservoir, and/or removal of scale in the production system equipment.

The equipment can be installed in the well construction phase, in the completion step. In operations to fight the loss of circulation in the well, the invention has the technical advantage of taking advantage of the completion fluid that the well will absorb to perform a previous inhibition of the reservoir, thus using the porous spaces of the reservoir rock to reserve inhibited completion fluid, which will thus be available inside the reservoir, when the well is producing.

The laser mandrel of this invention (9) will be mounted on the PS (1) in a position just below the electric intelligent completion valves (2 and 4) and will be coupled to the electrical cable (6) of the intelligent completion. The equipment (9) will consist of laser diodes (8), which generate the laser radiation, fiber optic cables (5) to conduct the laser energy, and collimators (7), which are responsible for projecting the laser beam inside the string (1).

The technology may be integrally applied in the management of scale in the wells and in ensuring the flow of production from the wells. It may further be applied as part of the technology used in the construction of wells in the completion phase.

The equipment will be installed in the PS (1) in a position designed to achieve the objective of dissolving the scales before they form a large amount of precipitate inside, mainly in the vicinity of the electrical ICVs (2 and 4).

Tests carried out in the laboratory proved that the application of laser radiation to generate tunnels (perforations) in plugs of carbonate rocks caused the thermal disintegration of carbonate into carbon dioxide ($CO_2$) and calcium oxide (CaO). Thus, the use of laser is applicable for the thermal dissolution of carbonate. Furthermore, reports of scale removal tests, by means of the application of heat to chelating solutions, demonstrated an increase in the reaction yield and, consequently, in the scale removal efficiency.

The laser mandrel of this invention shall be installed on the PS (1), in a position below the ICV valves (2 and 4), to be used, in a first moment, aiming at preventing the formation of scale on the ICV valves (2 and 4), and, in a second moment, for the removal of scale in the PS (1).

Figure 7:
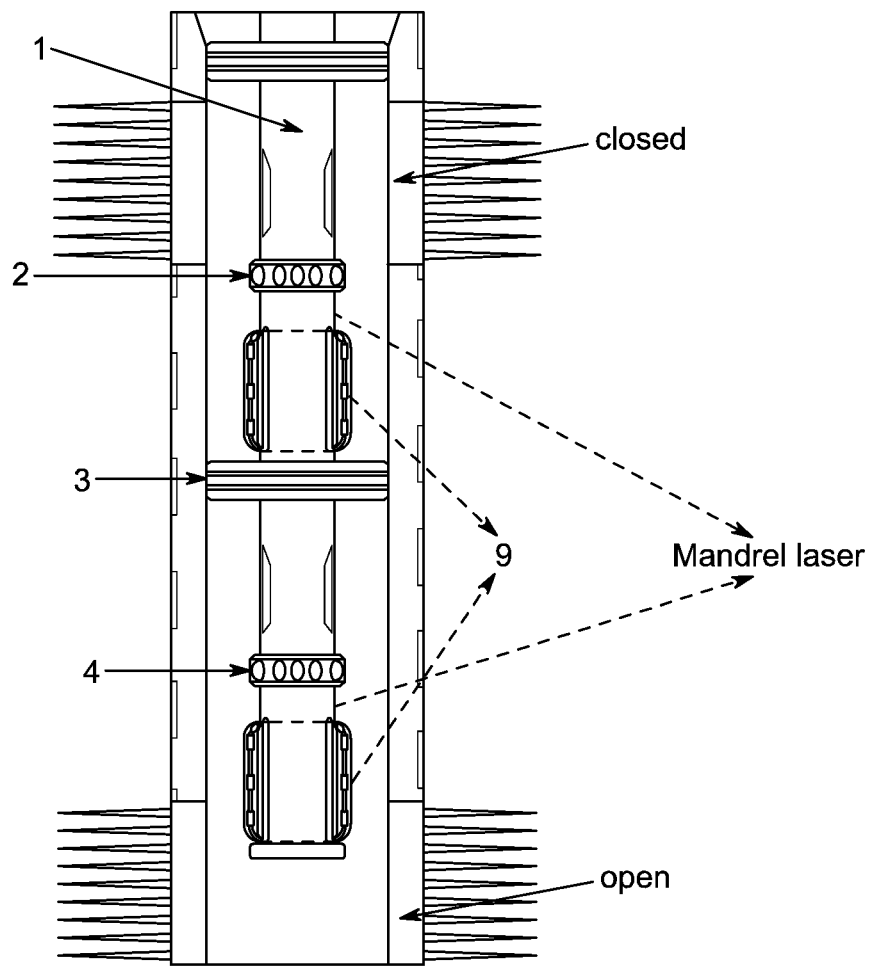
FIG. 7 illustrating the laser mandrel in a first option, to prevent scale.

To prevent the formation of scale in the valve holes (2 and 4), the mandrel (9) shall be periodically activated, promoting the heating of the oil produced by the well, in order to create greater turbulence inside the valves, inside the string, helping in the process of disaggregation of the scale. The mandrel laser (9) must be activated in the scale direction, inside the production string and below the ICVs. This option is demonstrated in FIG. 7.

Figure 8:
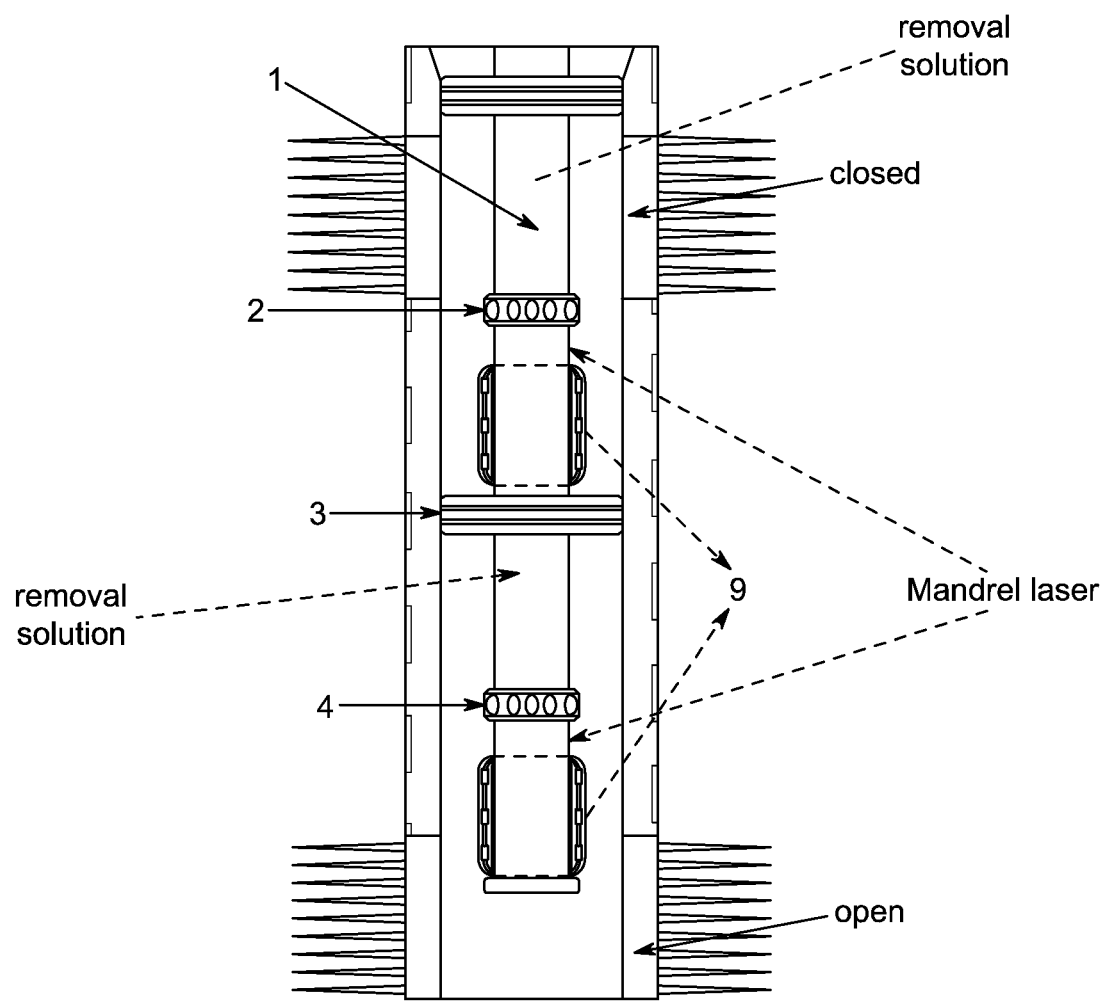
FIG. 8 illustrating the laser mandrel in a second option, for scale removal.

For the removal of the scale formed in the valves (2 and 4), the mandrel (9) shall be activated to heat the removal solutions. The laser mandrel (9) may help to increase the efficiency of remote treatments, because it will be able to heat the removal solutions that will be pumped by the SPU and/or stimulation boat into the PS (1) and positioned in front of the ICVs (2 and 4), inside the PS (1). In this case, the mandrel laser (9) shall be activated in the scale direction, inside the production string and below the ICVs (2 and 4), passing through the chelating remover solution. This option is demonstrated in FIG. 8.

As for the removal of scale in the PS (1) at points above the ICVs (2 and 4), the laser mandrel (9) may also help to increase the efficiency of remote treatments, by heating the removal solutions that will be pumped by the SPU and/or stimulation boat into the PS (1), in the region where the scale is positioned.

The invention claimed is:

1. A laser mandrel for removal of scale in production equipment, the laser mandrel comprising:
    a fiber optic cable;
    an electrical cable;
    collimators; and
    laser diodes,
    wherein the laser mandrel is installed in a production string just below a set of intelligent completion valves, the laser mandrel being coupled to the electrical cable.

2. The laser mandrel according to claim 1, wherein the laser mandrel is periodically driven to prevent scale inside the valves, inside the production string.

3. The laser mandrel according to claim 1, wherein the mandrel is driven to heat scale remover solutions inside the intelligent completion valves and in the production string.

4. The laser mandrel according to claim 1, wherein the scale comprises calcium carbonate scale.

* * * * *